Jan. 21, 1964 O. TJERNSTRÖM 3,118,520
ARRANGEMENT FOR AUTOMATIC REGULATION OF
AIR-GAP AND SPRING FORCE IN BRAKES
Filed Nov. 28, 1960
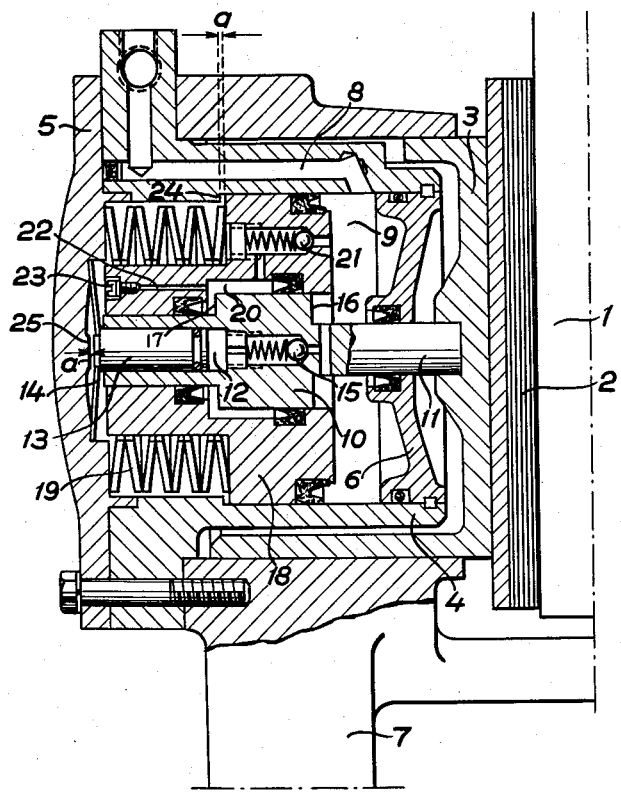
INVENTOR.
OVE Tjernström
BY
Bailey, Stephens & Huettig
ATTORNEYS

United States Patent Office 3,118,520
Patented Jan. 21, 1964

3,118,520
ARRANGEMENT FOR AUTOMATIC REGULATION OF AIR-GAP AND SPRING FORCE IN BRAKES
Ove Tjernström, Gideonsbergsgatan 4D,
Vasteras, Sweden
Filed Nov. 28, 1960, Ser. No. 72,178
4 Claims. (Cl. 188—170)

This invention relates to devices for automatic re-adjustment of air gap and spring force in brakes.

One object of the invention is accomplishing the said re-adjustment dependent upon the wear of the brake lining.

Another object of the invention is obtaining an automatic adjustment of the force of the brake spring when the brake lining is worn.

Still another object of the invention is obtaining an automatic adjustment of the air gap between the brake shoe and the brake disc when the brake lining is worn.

Said brakes for disengaging and engaging the brake shoe are hydraulically or pneumatically operated by leading a pressure medium to or from the brake cylinder.

It has been previously suggested to regulate the air gap of such a spring actuated brake in order to keep the time of falling or engaging of the brake at a constant value. In such a brake a piston is movably arranged in a brake cylinder and actuated by a brake spring, said piston being attached by a rod passing through one of the end walls of the cylinder to a brake shoe and having in a cylindrical boring a movably arranged coaxial piston of relatively small diameter, said coaxial piston supporting itself against the other end wall of the brake cylinder. The piston in connection with the brake shoe is provided with a non-return valve admitting the pressure medium only to pass into said boring. To lift or disengage the brake, the brake cylinder is fed with pressure medium and the non-return valve will admit pressure medium to pass into the boring of the piston, giving thus the smaller piston a displacement corresponding to the wear of the brake shoe, whereby the smaller piston will strike against the back end wall of the brake cylinder and prevent the piston in connection with the brake shoe from taking the same initial position as before the wear started.

The wear of the brake shoe leads with this type of brake, to a constantly diminishing force in the brake spring as the distance between the supporting points of the spring gradually increases, with the result that a constant braking moment cannot be maintained by this type of brake. To avoid this disadvantage the piston in connection with the brake shoe is, according to the invention, arranged axially movable in a surrounding coaxially movable piston actuated by the brake spring, the piston in connection with the brake shoe having two pressure areas of which the one facing the brake shoe end is larger than the other facing the other end of the brake cylinder, said surrounding piston having a certain clearance to the inner piston in the part of the smaller pressure area of the latter, forming thus a closed chamber between itself and the piston connected to the brake shoe, which chamber is fed with pressure medium through a non-return valve in the surrounding piston.

By arranging the brake spring to actuate a piston movable relatively to the piston connected to the brake shoe, the distance between the supporting points of the brake spring can be kept constant, independently if the piston connected to the brake shoe is kept from reaching its initial position by the previously mentioned small piston. The relative movement of the pistons causes an enlargement of the volume of said chamber, and the non-return valve in the surrounding piston will allow the pressure medium to pass into and to fill the chamber, so that no relative movement between the surrounding piston and the piston connected to the brake shoe will take place when the pressure is released in order to engage the brake shoe. Thus a regulation of the air gap as well as of the spring force is obtained, which ensures a constant time of falling and braking moment.

One embodiment of the arrangement according to the invention will now be particularly described with reference to the accompanying schematical drawing showing a longitudinal section of the arrangement with engaged brake.

In the drawing 1 indicates the brake wheel, 2 the brake lining and 3 the brake shoe. The brake cylinder 4 with its end walls 5 and 6 is fitted to a yoke 7 surrounding the cylinder. In the brake cylinder there is a duct 8 for the pressure medium, said duct leading to a cylindrical chamber 9. 10 indicates a piston connected by a rod 11 to the brake shoe 3. The piston 10 has a boring 12 in which a smaller piston 13 is situated, supported over a spring 14 against the end wall 5 of the cylinder. A non-return valve 15 admitting the pressure medium only to pass from the chamber 9 to the boring 12, is situated in the piston 10. The piston 10 has the shape of a double-acting piston with two pressure areas 16 and 17 of which the one 16 facing the brake shoe end of the cylinder 4 is larger than the other one 17 facing the other end of the brake cylinder. 18 indicates a piston surrounding the piston 10 connected to the brake shoe, said piston 18 being actuated by a strong brake spring 19. The piston 18 is movable coaxially with and relatively to the piston 10.

Near the smaller pressure area 17 of the piston 10, the latter is surrounded by the piston 18 with a certain clearance, which forms a closed chamber 20 between the piston 10 and the piston 18. This chamber 20 communicates with the cylinder chamber 9 through a non-return valve 21 in the piston 18, said non-return valve letting the pressure medium pass only into the chamber. 22 indicates a drainage duct in the piston 18, leading to the chamber 20, said duct being stopped up by a screw 23. 24 indicates a stop face in the brake cylinder 4 which is supporting the piston 18 when the brake shoe is disengaged. 25 indicates a stop face in the cylinder end wall 5 for the smaller piston 13.

The function of the brake is as follows:

When the brake is lifted or disengaged, i.e. when the pressure medium is acting in the cylinder chamber 9, the piston 18 and the piston 13 are supported by their stop faces 24 and 25 respectively. When the brake is engaged, i.e. when the pressure medium flows from the cylinder chamber 9 and the brake shoe 3 is pushed against the brake wheel 1, the piston 18 and the piston 13 move from their stop faces 24 and 25 a distance $a$ equal to the air gap of the brake. Due to the wear of the lining 2 of the brake shoe during the braking, a distance $\Delta a$ is added to the distance $a$, so that at the end of the braking period the pistons have been displaced a distance $a + \Delta a$.

The disengaging or lifting of the brake shoe is obtained by feeding the cylinder chamber 9 with pressure medium, said medium actuating partly the surrounding piston 18 to overcome the force of the brake spring 19, partly the piston 10 connected to the brake shoe, the area 16 of the piston being large enough to overcome the frictional drag working on the piston and the force on the area 17 and the force of the spring 14 at the smaller piston 13. When the pressure in the cylinder chamber is being built up, i.e. before the brake has lifted, a small amount of pressure medium is entering the boring 12 in the piston 10, thus slightly increasing the pressure on the smaller piston 13, whereby the spring 14 is given an additional strain corresponding to the strain loss due to the wear of the brake, i.e. the strain in the spring reaches the same value as before the wear of the brake lining took place.

The displacement of the piston 13 is then equal to the wear Δa of the lining 2. When the brake starts lifting, the pressure in the boring 12 exceeds the working pressure of the brake and the non-return valve 15 shuts, preventing thereby the pressure medium leaving the boring 12. This brings about that the piston 10 with the rod 11 and the brake shoe 3 at the lifting move backwards only the distance a before the piston 13 reaches the stop face 25. The surrounding piston 18 will therefore still move backwards a short distance Δa corresponding to the wear during the braking period before the piston 18 reaches its top face 24. The pressure medium passes thereby through the non-return valve 21 in the piston 18 into the chamber 20 at the smaller area 17 of the piston 10. The non-return valve 21 does not admit the pressure medium to return to the cylinder chamber 9. The brake spring 19 is now compressed to its initial strain and a regulation of the spring force has been obtained.

At braking the pressure in the chamber 20 rises very high and heavy demands are made upon the seals. By dimensioning the areas 16 and 17 the pressure must be taken into consideration which the seals of the chamber behind the piston 10 can stand. In order to eliminate the risk of leakage in the hydraulic or pneumatic system, a mechanical stopper can be arranged between the pistons 10 and 18, keeping the spring force at a constant value, i.e. the stopper prevents a relative movement between the pistons 10 and 18 at the moment any leakage causes a diminishing pressure in the chamber 20.

What I claim is:

1. In a brake having a shoe member, a stationary member and a brake wheel, means forming a brake cylinder having an abutment portion, a first piston slidable in said cylinder, a second piston slidable within the first piston, one of said members being rigid with the cylinder forming means and the other operatively connected with said second piston, the first piston having first and second bores therein and the second piston having two adjacent portions of different diameters and a shoulder connecting said portions, one of said portions being within and of less cross-section than the corresponding portion of the first bore so as to provide a space within the first bore outside such portion, said first piston having a portion slidably engaging the second piston on the side of said space remote from the second bore in the first piston, the other portion of the second piston fitting slidably in the second bore of the first piston, first spring means engaging the first piston and urging it in a direction to move the second piston, by action on the shoulder of the second piston of a pressure medium contained in said space, to cause engagement of the shoe member with the brake wheel, means to supply pressure medium under pressure to said cylinder in a direction to move the pistons against the force of the first spring means to disengage the shoe member from the brake wheel, first means connecting said space to the interior of the cylinder, a first one-way valve in said first connecting means providing movement of fluid therethrough in a direction corresponding to movement of the first piston with respect to the second piston away from brake engaging position, said second piston having a bore therein, a third piston slidable in said second-piston bore, second means connecting said second-piston bore to the interior of the cylinder, a second one-way valve in said second connecting means permitting flow therethrough from said cylinder to said second-piston bore only, and second spring means between the third piston and the abutment portion of the cylinder forming means resisting movement of the third piston away from the shoe member.

2. In a device as claimed in claim 1, stop means carried by the cylinder forming means and engageable with the first piston to limit the movement thereof away from brake engaging position.

3. In a device as claimed in claim 1, said first one-way valve allowing passage of fluid from the cylinder to the space.

4. In a device as claimed in claim 1, said third piston projecting from the end of said second-piston bore remote from the brake cylinder space, said second spring means engaging between the projecting end and the abutment portion of the brake cylinder forming means and a stop carried by the abutment portion of brake cylinder forming means engageable by the third piston for limiting the movement thereof against the action of said second spring means.

References Cited in the file of this patent

UNITED STATES PATENTS

| | | |
|---|---|---|
| 2,474,749 | Miller | June 28, 1949 |
| 2,726,641 | Hepola | Dec. 13, 1955 |
| 2,952,338 | Oswalt | Sept. 13, 1960 |